US000001404H

United States Statutory Invention Registration [19]

[11] Reg. Number: H1404

George

[43] Published: Jan. 3, 1995

[54] POLYKETONE POLYMER BLENDS

[75] Inventor: Eric R. George, Houston, Tex.

[73] Assignee: Shell Oil Company, Houston, Tex.

[21] Appl. No.: 775,382

[22] Filed: Oct. 15, 1991

[51] Int. Cl.[6] ..... C08L 77/00; C08F 283/00

[52] U.S. Cl. ..... 525/185; 525/539; 525/933

[58] Field of Search ..... 525/185, 539, 933

[56] References Cited

U.S. PATENT DOCUMENTS

| | | | |
|---|---|---|---|
| H917 | 5/1991 | Gergen et al. | 525/539 |
| 3,920,325 | 11/1975 | Swift | 118/621 |
| 4,788,279 | 11/1988 | Drent | 528/392 |
| 4,816,514 | 3/1989 | Lutz | 525/539 |
| 4,818,786 | 4/1989 | Gergen et al. | 525/539 |
| 4,843,144 | 6/1989 | Van Broekhoven et al. | 528/392 |
| 4,880,903 | 11/1989 | Van Broekhoven et al. | 528/392 |

OTHER PUBLICATIONS

"Encyclopedia of Polymer Science and Technology" John Wiley & Sons vol. 6 (1967), pp. 383–384.

*Primary Examiner*—Robert L. Stoll
*Assistant Examiner*—Joseph D. Anthony

[57] ABSTRACT

Improved compositions comprise polymer blends of a linear alternating polymer of carbon monoxide and at least one ethylenically unsaturated hydrocarbon with an amorphous olefinic copolymer which is optionally maleated. The blends demonstrate improved barrier properties.

20 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

POLYKETONE POLYMER BLENDS

FIELD OF THE INVENTION

This invention relates to polyketone blends, and, more particularly, to blends of a polyketone and amorphous olefinic copolymer.

BACKGROUND OF THE INVENTION

The polyketone polymers are relatively high molecular weight materials having established utility as premium thermoplastics in the production of shaped articles, such as containers for food and beverages, film for packaging, and flexible parts for automotive applications, which are produced by processing the polyketone polymer according to well known methods. For some particular applications, it is desirable to have properties which are somewhat different from those of the polyketone polymers. The more desirable properties of the polyketone polymers may be retained, and yet other properties improved, through the preparation of a polymer blend.

In order to improve the utility of polyketone polymers in food and beverage packaging and other applications, it would be desirable to improve the barrier properties of the polyketone polymer. It has been found that an amorphous olefinic copolymer may be blended with a polyketone polymer to produce blend compositions which exhibit improved barrier properties as well as a good balance of mechanical properties such that the blends have utility in food and beverage packagaging applications.

SUMMARY OF THE INVENTION

The present invention provides blends of a linear alternating polyketone polymer of carbon monoxide and at least one ethylenically unsaturated hydrocarbon with an amorphous olefinic copolymer. More particularly, the invention provides a polyketone polymer blend containing from about 5 wt % to about 25 wt % amorphous olefinic copolymer, preferably from about 15 wt % to about 25 wt % amorphous olefinic copolymer, and most preferably about 20 wt % amorphous olefinic copolymer. The olefinic copolymer is preferably an amorphous ethylene-propylene copolymer, and more preferably a maleated ethylene-propylene copolymer. The polyketone blends exhibit a good balance of mechanical properties, as well as improved barrier properties, particularly water vapor barrier. The invention also includes a method of improving the barrier properties of a polyketone polymer through incorporating therein the amorphous olefinic copolymer.

DESCRIPTION OF THE INVENTION

The polyketone polymers used in the blends of the invention are of a linear alternating structure and contain substantially one molecule of carbon monoxide for each molecule of unsaturated hydrocarbon. Suitable ethylenically unsaturated hydrocarbons for use as monomers in the polyketone polymers have up to 20 carbon atoms inclusive, preferably up to 10 carbon atoms, and are aliphatic such as ethylene and other α-olefins including propylene, 1-butene, isobutylene, 1-hexene, 1-octene and 1-dodecene, or are arylaliphatic containing an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and misopropylstyrene. The preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propylene.

When the preferred polyketone terpolymers are employed as the major polymeric component of the blends of the invention, there will be within the terpolymer at least about 2 units incorporating a monomer of ethylene for each unit incorporating a monomer of the second hydrocarbon. Preferably, there will be from about 10 units to about 100 units incorporating a monomer of ethylene for each unit incorporating a monomer of the second hydrocarbon. The polymer chain of the preferred polyketone polymers is therefore represented by the repeating formula $$\left[CO\left(CH_2-CH_2\right)\right]_x\left[CO\left(G\right)\right]_y$$

wherein G is the monomer of ethylenically unsaturated hydrocarbon of at least 3 carbon atoms polymerized through the ethylenic unsaturation and the ratio of y:x is no more than about 0.5. When copolymers of carbon monoxide and ethylene are employed in the blends of the invention, there will be no second hydrocarbon present and the copolymers are represented by the above formula wherein y is zero. When y is other than zero, i.e., terpolymers are employed, the $-CO\left(CH_2CH_2\right)-$ units and the $-CO\left(G\right)-$ units are found randomly throughout the polymer chain, and preferred ratios of y:x are from about 0.01 to about 0.1. The end groups or "caps" of the polymer chain will depend upon what materials were present during the production of the polymer and whether or how the polymer was purified. The precise nature of the end groups does not appear to influence the properties of the polymer to any considerable extent so that the polymers are fairly represented by the formula for the polymer chain as depicted above.

Of particular interest are the polyketone polymers of number average molecular weight from about 1000 to about 200,000, particularly those of number average molecular weight from about 20,000 to about 90,000 as determined by gel permeation chromatography. The physical properties of the polymer will depend in part upon the molecular weight, whether the polymer is a copolymer or a terpolymer and, in the case of terpolymers, the nature of and the proportion of the second hydrocarbon present. Typical melting points for the polymers are from about 175° C. to about 300° C., more typically from about 210° C. to about 270° C. The polymers have a limiting viscosity number (LVN), measured in m-cresol at 60° C. in a standard capillary viscosity measuring device, from about 0.5 dl/g to about 10 dl/g, more frequently from about 0.8 dl/g to about 4 dl/g.

U.S. Pat No. 4,880,903 (Van Broekhoven et al.) discloses a linear alternating polyketone terpolymer of carbon monoxide, ethylene, and other olefinically unsaturated hydrocarbons, such as propylene. Processes for production of the polyketone polymers typically involve the use of a catalyst composition formed from a compound of a Group VIII metal selected from palladium, cobalt or nickel, the anion of a strong non-hydrohalogenic acid and a bidentate ligand of phosphorus, arsenic or antimony. U.S. Pat. No. 4,843,144 (Van Broekhoven et al.) discloses a process for preparing polymers of carbon monoxide and at least one ethylenically unsaturated hydrocarbon using a catalyst comprising a compound of palladium, the anion of a non-hydrohalogenic acid having a pKa of below about 6 and a bidentate ligand of phosphorus.

The carbon monoxide and hydrocarbon monomer(s) are contacted under polymerization conditions in the presence of a catalyst composition formed from a compound of palladium, the anion of a non-hydrohalogenic acid having a pKa (measured in water at 18° C.) of below about 6, preferably below 2, and a bidentate ligand of phosphorus. The scope of the polymerization is extensive but, without wishing to be limited, a preferred palladium compound is a palladium carboxylate, particularly palladium acetate, a preferred anion is the anion of trifluoroacetic acid or p-toluenesulfonic acid and a preferred bidentate ligand of phosphorus is 1,3-bis(diphenylphosphino)propane or 1,3-bis[di(2-methoxyphenyl)phosphino]propane.

The polymerization to produce the polyketone polymer is conducted in an inert reaction diluent, preferably an alkanolic diluent, and methanol is preferred. The reactants, catalyst composition and reaction diluent are contacted by conventional methods such as shaking, stirring or refluxing in a suitable reaction vessel. Typical polymerization conditions include a reaction temperature from about 20° C. to about 150° C., preferably from about 50° C. to about 135° C. The reaction pressure is suitably from about 1 atomosphere to about 200 atmospheres but pressures from about 10 atmospheres to about 100 atmospheres are preferred. Subsequent to polymerization, the reaction is terminated as by cooling the reactor and contents and releasing the pressure. The polyketone polymer is typically obtained as a product substantially insoluble in the reaction diluent and the product is recovered by conventional methods such as filtration or decantation. The polyketone polymer is used as recovered or the polymer is purified as by contact with a solvent or extraction agent which is selective for catalyst residues.

The second component of the blends of the invention is an amorphous olefinic copolymer derived essentially from ethylene and propylene, commonly described as an ethylene propylene rubber (EPR). These copolymers may contain minor amounts, such as up to about 10 mol % relative to the ethylene and propylene monomers, of polymerized units derived from other olefin monomers. Such other olefin monomers include olefins of the general formula $RCH{=}CH_2$, in which R is an aliphatic or cycloaliphatic radical of from 2 to about 20 carbon atoms, for example, butene-1, hexene-1, 4-methyl-1pentene, decene-1, etc.

A suitable EPR contains from about 30 to about 65 mol % propylene preferably from about 35 to about 45 mol % propylene, and has a number average molecular weight of between about 70,000 and about 300,000, preferably between about 80,000 and about 200,000. It is also preferred that the EPR contain at least 150 pendant methyl groups per 1,000 chain carbon atoms. Methods of preparation of these copolymers are well known in the art. Vistalon® 719, a high ethylene content EPR available from Exxon Chemical Company, is particularly useful in the subject invention.

The preferred EPR is a maleated EPR, obtained by reacting EPR with a maleic acid compound. Illustrative of such maleic acid compounds are maleic acid, maleic anhydride, fumaric acid, methylmaleic acid, dimethylmaleic acid, and methylmaleic anhydride, with maleic anhydride being preferred. The maleation of the EPR is conducted, for example, by mixing the EPR and the maleic acid compound, and maintaining the mixtures at an elevated temperature, for example up to about 300° C., generally in the presence of a catalyst or a free radical initiator. Such methods are well known in the art. Exxolor® VA1801, a maleated EPR available from Exxon Chemical Company, is particularly useful in the subject invention.

The precise percentage of the EPR (or maleated EPR) to be employed in the blends of the invention will depend upon the anticipated end use for the blend. Compositions containing from about 5 wt % to about 25 wt % EPR, based on total blend, are believed to be satisfactory, with from about 15 wt % to about 25 wt % being preferred, and about 20 wt % being most preferred.

The blends of the invention may also include additives such as antioxidants and stabilizers, dyes, fillers or reinforcing agents, fire resistant materials, mold release agents, colorants and other materials designed to improve the processability of the polymers or the properties of the resulting blend. Such additives are added prior to, together with or subsequent to the blending of the polyketone and the other components.

The method of producing the blends of the invention is not material so long as a uniform blend is produced without undue degradation of the blend or its components. In one modification the polymer components of the blend are extruded in a corotating twin screw extruder to produce the blend. In an alternate modification, the polymer components are blended in a mixing device which exhibits high shear. The blends are processed by methods such as extrusion and injection molding into sheets, films, plates and shaped parts. Illustrative of such applications are the production of articles useful in both rigid and flexible packaging applications. Specific applications include films, containers, and bottles, which may be made by thermoforming injection or extrusion blow molding, etc.

The invention is further illustrated by the following Examples which should not be regarded as limiting.

EXAMPLE 1

A linear alternating terpolymer of carbon monoxide, ethylene, and propylene (90/064) was produced in the presence of a catalyst composition formed from palladium acetate, trifluoroacetic acid and 1,3-bis[di(2-methoxyphenyl)phosphino]propane. The polyketone polymer had a melting point of about 220° C. and an LVN of about 1.1 dl/g when measured in m-cresol at 60° C. The polyketone polymer also contained conventional additives.

EXAMPLE 2

Blends were prepared of the polyketone terpolymer of Example 1 and two different EPRs: (1) Vistalon 719, a high ethylene-content EPR, and (2) Exxolor VA1801, a maleated EPR, both available from Exxon Chemical Company. The blends prepared are shown in Table 1. The blends were compounded on a Haake 30 mm corotating twin screw extruder, at a melt temperature of about 240° C. Subsequent to blending, specimens of the blends were molded into plaques on a 25 ton Arburg injection molding machine. Molded specimens were stored over desiccant until tested. Mechanical testing was performed on "dry as molded" specimens. Results of the mechanical testing are shown in Table 1.

TABLE 1

| Blend Component | Composition (Polyketone/EPR) | Tensile Properties Strength at Break (PSI) | Tensile Properties Elongation at Break (%) | Flexural Modulus (PSI) | Notched Izod (ft-lb/in) Room Temperature | Gardner Impact (in-lb) Room Temperature | Water Vapor Transmission Rate (% wt loss/year) Before Retort | Water Vapor Transmission Rate (% wt loss/year) After Retort |
|---|---|---|---|---|---|---|---|---|
| | 100/0 | 6790 | 87 | 259,000 | 1.71 | 42 | 8.0 | 12.0 |
| Vistalon 719 | 95/5 | 7897 | 25 | 243,000 | 1.15 | 42 | 6.9 | 9.5 |
| Vistalon 719 | 90/10 | — | — | — | — | — | 5.7 | 7.9 |
| Vistalon 719 | 80/20 | 5397 | 40 | 168,000 | 1.11 | 21 | 4.8 | 6.2 |
| Exxolor VA1801 | 95/5 | 7260 | 26 | 232,000 | 1.17 | 40 | 6.5 | 9.2 |
| Exxolor VA1801 | 90/10 | 6647 | 26 | 220,667 | 1.17 | 59 | 5.5 | 7.7 |
| Exxolor VA1801 | 80/20 | 5400 | 41 | 157,000 | 1.09 | 62 | 3.9 | 5.0 |

Specimens of the blends were also molded into 7.5 oz. cups using a Krauss-Maffei 100-ton injection molding machine. The cups had an average wall thickness of about 25 mils. The cups were filled with water, double seamed with an aluminum lid, maintained in a 50% relative humidity environment, and weighed periodically to determine the water vapor transmission rate loss over time. Some of the samples were also subjected to a retort cycle in a Barnstead benchtop sterilization unit with 15 psi overpressure. The retort temperature was increased until the internal temperature reached 260° F., at which point the container was slowly cooled to 150° F. Water vapor transmission rate results are shown in Table 1.

Both EPRs reduced the water vapor transmission rate of the unblended polyketone polymer. Exxolor VA1801, the maleated EPR, provided the best results, reducing the WVTR to 3.9% weight loss/year before retort, and 5.0% weight loss/year after retort, when present at 20 wt % in the polyketone polymer. Both EPRs also improved the flexibility of the polymer, as demonstrated by a reduction in the flexural modulus. Increased flexibility is useful both for packaging and for other applications. Both EPRs reduced Notched Izod values, as was expected, but each had a unique effect on Gardner impact values. The Vistalon 719 significantly reduced Gardner impact, while the Exxolor VA1801 improved Gardner impact when present at 10 wt % or more in the polyketone polymer.

What is claimed is:

1. A method for improving the barrier properties of a linear alternating polyketone polymer of carbon monoxide and at least one ethylenically unsaturated hydrocarbon by incorporating therein an effective amount of an amorphous olefinic copolymer.

2. The method of claim 1 wherein the polyketone polymer is of the repeating formula $$\left[CO\left(CH_2-CH_2\right)\right]_x\left[CO\left(G\right)\right]_y$$

wherein G is a monomer of an ethylenically unsaturated hydrocarbon of at least 3 carbon atoms polymerized through the ethylenic unsaturation, and the ratio of y:x is no more than about 0.5.

3. The method of claim 2 wherein the amorphous olefinic copolymer is an amorphous ethylene-propylene copolymer.

4. The method of claim 3 wherein the barrier property water vapor transmission rate is less than about 5 wt % loss/year before retort.

5. The method of claim 2 wherein the maleated amorphous olefinic copolymer is a maleated amorphous ethylene-propylene copolymer.

6. The method of claim 5 wherein the barrier property water vapor transmission rate is less than about 5 wt % loss/year before retort.

7. A polymer blend composition comprising a major proportion of a linear alternating polyketone polymer and a lesser proportion of an amorphous olefinic copolymer.

8. The composition of claim 7 wherein the polyketone polymer is represented by the repeating formula $$\left[CO\left(CH_2-CH_2\right)\right]_x\left[CO\left(G\right)\right]_y$$

wherein G is a monomer of an ethylenically unsaturated hydrocarbon of at least 3 carbon atoms polymerized through the ethylenic unsaturation and the ratio of y:x is no more than about 0.5.

9. The composition of claim 8 wherein, in the polyketone polymer, G is a monomer of propylene and the ratio of y:x is from about 0.01 to about 0.1.

10. The composition of claim 8 wherein, in the polyketone polymer, y is zero.

11. The composition of claim 8 wherein the amorphous olefinic copolymer is an amorphous ethylene-propylene copolymer.

12. The composition of claim 11 wherein the ethylene-propylene copolymer comprises from about 5 wt % to about 25 wt % of the total blend.

13. The composition of claim 11 wherein the ethylene-propylene copolymer comprises from about 15 wt % to about 25 wt % of the total blend.

14. The composition of claim 11 wherein the ethylene-propylene copolymer comprises about 20 wt % of the total blend.

15. The composition of claim 8 wherein the amorphous olefinic copolymer is a maleated amorphous ethylene-propylene copolymer.

16. The composition of claim 15 wherein the maleated ethylene-propylene copolymer comprises from about 5 wt % to about 25 wt % of the total blend.

17. The composition of claim 15 wherein the maleated ethylene-propylene copolymer comprises from about 15 wt % to about 25 wt % of the total blend.

18. The composition of claim 15 wherein the maleated ethylene-propylene copolymer comprises about 20 wt % of the total blend.

19. A composition comprising a blend of:

a major proportion of a linear alternating polyketone polymer of carbon monoxide and at least one ethylenically unsaturated hydrocarbon, wherein the linear alternating polyketone polymer is represented by the repeating formula $$\left[CO\left(CH_2-CH_2\right)\right]_x\left[CO\left(G\right)\right]_y$$

wherein G is a monomer of an ethylenically unsaturated hydrocarbon of at least 3 carbon atoms polymerized through the ethylenic unsaturation and the ratio of y:x is no more than about 0.5, and from about 15 wt % to about 25 wt %, based on the total blend, a maleated amorphous ethylene-propylene copolymer.

20. The composition of claim 19 wherein, in the linear alternating polymer, y is zero.

* * * * *